(12) United States Patent
Journade et al.

(10) Patent No.: US 8,733,693 B2
(45) Date of Patent: May 27, 2014

(54) AIRCRAFT ENGINE ASSEMBLY COMPRISING AN ANNULAR LOAD-TRANSFER STRUCTURE SURROUNDING THE CENTRAL CASING OF A TURBOJET ENGINE

(75) Inventors: Frédéric Journade, Toulouse (FR); Delphine Jalbert, Seilh (FR)

(73) Assignee: Airbus Operations S.A.S., Toulouse (FR)

( * ) Notice: Subject to any disclaimer, the term of this patent is extended or adjusted under 35 U.S.C. 154(b) by 736 days.

(21) Appl. No.: 12/918,334

(22) PCT Filed: Feb. 27, 2009

(86) PCT No.: PCT/FR2009/050324
§ 371 (c)(1),
(2), (4) Date: Mar. 14, 2011

(87) PCT Pub. No.: WO2009/112781
PCT Pub. Date: Sep. 17, 2009

(65) Prior Publication Data
US 2011/0290934 A1    Dec. 1, 2011

(30) Foreign Application Priority Data
Feb. 28, 2008 (FR) ...................................... 08 51282

(51) Int. Cl.
*B64D 27/26* (2006.01)
*F02C 7/20* (2006.01)

(52) U.S. Cl.
USPC .............................. 244/54; 60/796; 248/554

(58) Field of Classification Search
USPC .......... 244/54, 55; 248/554–557; 60/796, 797
See application file for complete search history.

(56) References Cited

U.S. PATENT DOCUMENTS 2,965,338 A * 12/1960 McLean ........................ 248/556
3,540,682 A * 11/1970 Howard et al. ............. 244/53 R
(Continued)

FOREIGN PATENT DOCUMENTS

| EP | 0 028970   | 5/1981  |
|----|------------|---------|
| EP | 0 519 823  | 12/1992 |
| EP | 1 580 124  | 9/2005  |
| GB | 2 021 696  | 12/1979 |

OTHER PUBLICATIONS

U.S. Appl. No. 12/677,139, filed Mar. 9, 2010, Journade, et al.
U.S. Appl. No. 12/918,500, filed Aug. 20, 2010, Journade, et al.

(Continued)

*Primary Examiner* — Joseph W Sanderson
(74) *Attorney, Agent, or Firm* — Oblon, Spivak, McClelland, Maier & Neustadt, L.L.P.

(57) ABSTRACT

An aircraft engine assembly with an annular load-transfer structure surrounding the central casing (16) and mechanically connected to a plurality of substantially planar reinforcing structures (64a-c) arranged externally with respect to the annular load-transfer structure, and biasing it at a plurality of load application points (68a, 68b, 68c). At least one connecting rod is associated with a load application point, with the connecting rod positioned tangentially with respect to the casing (16), and having an inner end (62a) connected to this casing, as well as an outer end (62a) connected to the annular load-transfer structure (60) so that the outer end of the connecting rod is in an imaginary plane (66a, 66b, 66c) in which the annular load-transfer structure is located and which extends through the load application point.

7 Claims, 13 Drawing Sheets

(56) References Cited

U.S. PATENT DOCUMENTS

| | | | |
|---|---|---|---|
| 3,750,983 A * | 8/1973 | Morris | 244/54 |
| 4,266,741 A | 5/1981 | Murphy | |
| 4,441,313 A | 4/1984 | Joubert et al. | |
| 5,190,245 A * | 3/1993 | Debeneix | 244/54 |
| 5,226,288 A * | 7/1993 | Cornax | 60/226.1 |
| 5,259,183 A | 11/1993 | Debeneix | |
| 5,860,275 A * | 1/1999 | Newton et al. | 60/226.1 |
| 6,976,655 B2 * | 12/2005 | Thompson | 244/54 |
| 7,313,920 B2 * | 1/2008 | Stretton et al. | 60/797 |
| 7,445,179 B2 | 11/2008 | Diochon et al. | |
| 7,448,573 B2 | 11/2008 | Lafont et al. | |
| 7,527,220 B2 * | 5/2009 | Dron | 244/54 |
| 7,797,947 B2 | 9/2010 | Lafont et al. | |
| 7,806,363 B2 * | 10/2010 | Udall et al. | 244/54 |
| 8,313,293 B2 * | 11/2012 | Heyerman et al. | 415/213.1 |
| 2004/0108413 A1 * | 6/2004 | Thompson | 244/54 |
| 2005/0269446 A1 | 12/2005 | Dron | |
| 2006/0000944 A1 * | 1/2006 | Dron | 244/54 |
| 2007/0084218 A1 * | 4/2007 | Udall | 60/796 |
| 2007/0246603 A1 * | 10/2007 | Udall et al. | 244/54 |
| 2008/0223983 A1 | 9/2008 | Lafont et al. | |
| 2008/0245926 A1 | 10/2008 | Journade et al. | |
| 2008/0251633 A1 | 10/2008 | Journade et al. | |
| 2008/0272229 A1 | 11/2008 | Lafont et al. | |
| 2010/0163671 A1 * | 7/2010 | Svensson et al. | 244/54 |
| 2010/0287950 A1 * | 11/2010 | Heyerman et al. | 60/797 |
| 2011/0048029 A1 * | 3/2011 | Watson et al. | 60/797 |
| 2011/0154831 A1 * | 6/2011 | Journade et al. | 60/797 |
| 2011/0168837 A1 * | 7/2011 | Balk et al. | 244/54 |
| 2011/0197595 A1 * | 8/2011 | Journade et al. | 60/797 |
| 2012/0111995 A1 * | 5/2012 | Lafont | 244/54 |

OTHER PUBLICATIONS

U.S. Appl. No. 12/918,530, filed Aug. 20, 2010, Journade, et al.

* cited by examiner

AIRCRAFT ENGINE ASSEMBLY COMPRISING AN ANNULAR LOAD-TRANSFER STRUCTURE SURROUNDING THE CENTRAL CASING OF A TURBOJET ENGINE

BACKGROUND OF THE INVENTION

1. Field of the Invention

The present invention relates generally to an aircraft engine assembly of the type comprising a turbojet engine, a nacelle surrounding the turbojet engine, as well as an attachment pylon provided with a rigid structure and a plurality of engine mounts placed between a rigid structure of the attachment pylon and the turbojet engine.

The attachment pylon is also called an EMS ("Engine Mounting Structure") and can be used to suspend the turbojet engine below the aircraft wing, or to mount the turbojet engine above this same wing, or else to mount it to the aft section of the fuselage. It is indeed provided to constitute the connecting interface between the turbojet engine and a given structural portion of the aircraft. It transmits forces generated by the associated turbojet engine to the structure of this aircraft, and it also enables routing of fuel, electrical, hydraulic and air systems between the engine and the aircraft.

The nacelle is conventionally equipped with several cowls surrounding the turbojet engine and providing access to this latter in the open position, these cowls being known under the names fan cowls and thrust reverser cowls.

2. Description of the Related Art

More precisely, certain engine assemblies of the prior art are provided with an attachment pylon having a rigid structure comprising a longitudinal caisson as well as two lateral caissons affixed to the longitudinal caisson and arranged on both sides of the latter, the pylon also comprising means for mounting the turbojet engine onto the rigid structure, these means comprising a first, second, and third front engine mounts for transferring thrust forces to the fan casing. As schematically shown in FIG. 1 showing a prior art embodiment in which the engine is adapted to be suspended under the aircraft wing, the three front engine mounts transferring thrust forces are arranged so that the third front engine mount 8 passes through a diametral plane P1 of the turbojet engine, here the vertical plane of symmetry of the turbojet engine, whereas the first and second engine mounts 6a, 6b, respectively adapted to be connected to the two lateral caissons of the pylon, are arranged on both sides of the diametral plane P1, and usually extend through another diametral plane P2 of the turbojet engine, orthogonal to the aforementioned diametral plane and corresponding here to the horizontal plane of symmetry of the turbojet engine.

Furthermore, the turbojet engine conventionally comprises a fan casing 12, an intermediate casing 21 located radially toward the inside with respect to the fan casing and connected to the latter by means of a plurality of structural arms 17, preferably radially oriented, as well as a central casing 16, also referred to as a "core" casing, extending the intermediate casing 21 toward the rear. Finally, it must be noted that the central casing extends up to a rear end 19 of greater dimension, also called the ejection casing.

As shown in FIG. 2, the engine assembly comprises an annular load-transfer structure 60 surrounding the central casing 16 and mechanically connected to the latter by the intermediary of mounting means 62, conventionally comprising a plurality of connecting rods. As schematically shown by the arrows 76, the annular structure 60 is also connected to a plurality of structures (not shown) arranged externally with respect to the latter, and acting upon it, for example radially, respectively at a plurality of load application points, generally circumferentially distributed on the latter.

Therefore, the annular structure makes it possible to transmit forces between the central casing and the outer structures, whereby the latter can be, for example, the outer radial delimiting structure of the annular bypass air duct (in English "OFS", Outlet Fan Structure), and/or the inner radial delimiting structure of the annular bypass air duct (in English "IFS", Inlet Fan Structure).

However, in the solutions of the prior art, the arrangement of the aforementioned connecting rods not being optimized, the passage of forces causes the annular load-transfer structure and/or central casing to deform, which, naturally, is not desirable.

BRIEF SUMMARY OF THE INVENTION

Therefore, the object of the invention is to propose an aircraft engine assembly solving, at least partially, the problems hereinabove mentioned, relative to the prior art embodiments.

To do so, the object of the invention is an aircraft engine assembly comprising:
  a turbojet engine comprising a fan casing, an intermediate casing located radially toward the inside with respect to the fan casing and connected to the latter by a plurality of structural arms, preferably radially oriented, as well as a central casing extending along said intermediate casing toward the rear;
  an annular load-transfer structure surrounding the central casing and mechanically connected to the latter by the intermediary of mounting means comprising a plurality of connecting rods, said annular load-transfer_structure being also connected to a plurality of substantially planar reinforcing structures arranged externally with respect to this annular load-transfer structure, and biasing it respectively at a plurality of load application points, generally circumferentially distributed on the latter.

According to the invention, at least one connecting rod is associated with each of the load application points, said connecting rod, when viewed from the front along a longitudinal axis of the turbojet engine, being positioned tangentially with respect to the central casing, and having an inner end connected to this central casing, as well as an outer end connected to said annular load-transfer structure so that it has extending through it an imaginary plane in which said annular load-transfer_structure is located and extends through said load application point.

The invention also has the advantage of placing, viewed from the front, each load application point and the outer end of the connecting rod in the same imaginary plane, preferably radial, in which is also arranged the load introduced in the annular load-transfer structure, by the outer structure of the same plane associated with the related load application point. Consequently, the aforementioned load, substantially radial or not, is taken up jointly by a compressive or tensile stress in the connecting rod, as well as by a necessarily substantially tangential stress in the annular load-transfer_structure, also referred to as membrane stress. Consequently, in the area of each one of the load application points of the annular load-transfer structure, the annular load-transfer structure tends to react to the mechanical biasing of the outer structures by a substantially tangential stress, the biasing strongly limiting deformations of the annular load-transfer structure, and, in particular, preventing the load-transfer structure from elongating.

Furthermore, the connecting rods being placed tangentially with respect to the central casing onto which they are connected, the deformations of this casing are also greatly limited.

The invention therefore generally provides for a mechanical junction that is better optimized between the annular load-transfer structure and the central casing, allowing for taking up, in a satisfactory manner, the load passing through the outerstructures connected to the annular load-transfer structure.

Preferably, as mentioned hereinabove, said substantially planar reinforcing structures are arranged substantially radially and bias substantially radially said annular load-transfer structure. Each imaginary plane is therefore substantially radial, extending through the longitudinal axis of the turbojet engine. More generally, each substantially planar reinforcing structure preferably extends in an imaginary plane that is substantially parallel to the longitudinal axis of the turbojet engine, or integrating this same longitudinal axis.

Preferably, said connecting rods are arranged substantially in the same transverse plane of the turbojet engine.

Preferably also, in order to best provide for the thermal expansion of the central casing with respect to the annular load-transfer structure surrounding the central casing, said connecting rods have inner and outer ends mounted as ball joints.

Preferably, said connecting rods all extend in the same circumferential direction from their outer end. With this configuration, in case of a differential thermal expansion, between the annular load-transfer structure and the casing or between the annular load-transfer structure and the connecting rods, the annular load-transfer structure can advantageously turn around the central casing, while staying coaxially positioned with respect to said central casing.

Preferably, the engine assembly also comprises an attachment pylon having a pylon_rigid structure 10 and means for mounting said turbojet engine on the pylon_rigid structure, said mounting means comprising first, second, and third front engine mounts for transferring thrust forces to the fan casing, and arranged so that said third front engine mount extends through a first diametral plane of the turbojet engine, said first and second front engine mounts are arranged on both sides of this first diametral plane, and each of said first, second, and third front engine mounts is associated with a reinforcing structure 64 forming a shear plane, and fixedly connected:

in the area of the annular load-transfer_structure at a first anchoring point forming said load application point in said annular load-transfer_structure;
in the area of the fan casing at a second anchoring point; and
in the area of a structural arm or of the intermediate casing at a third anchoring point, said reinforcing structure extending along said imaginary plane extending through said load application point, and also at an anchoring point of said front engine mount on the fan casing.

Having these reinforcing structures 64a-c biased in shearing allows for rigidifying the turbojet engine in the three aforementioned imaginary planes, involving a limitation of the flexion of the central casing and of the intermediate casing, even in case of inertial biasing in these planes. As a result, the overall performance of the engine assembly is improved.

Furthermore, adding reinforcing structures provides for rigidified structural arms in and, in the vicinity of, the two imaginary planes associated with the first and second engine mounts, that is, where the arms are typically biased the most. This advantageously results in a decrease of deformations in the structural arms. Consequently, the fan casing has less of a tendency to open in the plane of the structural arms, which greatly limits the undesirable elongation effects occurring with first and second engine mounts diametrically opposed. This translates in a better performance of the fan, and therefore a better overall performance of the turbojet engine.

Furthermore, the reinforcing structures forming a shear plane perfectly play their role due to the non-deformation hereinabove mentioned of the annular load-transfer structure onto which they are connected by means of the load application points.

Still in a preferable manner, said reinforcing structures are deprived of direct mechanical connection with said pylon, which makes it possible to avoid introducing additional forces in this latter. Consequently, the aforementioned mounting means can stay isostatic despite the presence of reinforcing structures. By way of example, for identical reasons, said reinforcing structures are made to be deprived of direct mechanical connection with the nacelle of the related engine assembly.

Preferably, said first and second front engine mounts are connected to the fan casing respectively at two points located beyond the second diametral plane of the turbojet engine, orthogonal to the first diametral plane, with respect to said third front engine mount. Alternatively, the first and second front engine mounts could be connected to the fan casing, respectively, at two points situated in this second diametral plane, without leaving the scope of the invention.

Preferably, said first and second front engine mounts for taking up thrust forces are positioned symmetrically with respect to said first diametral plane defined by a longitudinal axis of the turbojet engine, parallel to a longitudinal direction of the latter, and a first direction of said turbojet engine, orthogonal to the longitudinal direction.

Preferably still, the first and second front engine mounts are each designed so as to take up forces exerted along the longitudinal direction and along said first direction of the turbojet engine, and said third front engine mount is designed so as to take up forces exerted along the longitudinal direction and along a second direction of the turbojet engine, orthogonal to said first direction and to the longitudinal direction.

By way of example, it is noted that, in the case where the turbojet engine is adapted to be mounted above the aircraft wing or suspended below the latter, the first and second directions, orthogonal to one another and orthogonal to the longitudinal direction are preferably the vertical and transverse directions of the turbojet engine, respectively. On the other hand, although it could also be the case in the context of the mounting of the engine assembly at the aft section of the aircraft fuselage, the first and second directions can each be inclined with respect to the vertical and transverse directions of the turbojet engine.

In this configuration, said mounting means are only constituted by the aforementioned front mounts, fixed to the fan casing of the turbojet engine, and forming an isostatic load transfer system. More generally, the only mounting means fixed to the fan casing are provided to be either said first, second, and third engine mounts, even in other cases where an additional engine mount is provided between the rigid structure of the pylon and the central casing, still so as to form an isostatic load transfer system.

Preferably, as mentioned hereinabove, said first direction of the turbojet engine corresponds to a vertical direction of the latter, and said second direction of the turbojet engine corresponds to a transverse direction of the latter.

Another object of the present invention relates to an aircraft comprising at least one engine assembly such as described hereinabove, assembled on a wing or on an aft section of the aircraft fuselage.

Other advantages and characteristics of the invention will become apparent from the non-limiting detailed description hereinafter.

BRIEF DESCRIPTION OF THE DRAWINGS

This description will be carried out from the annexed drawings, in which.

DETAILED DESCRIPTION OF THE INVENTION

Figure 3:
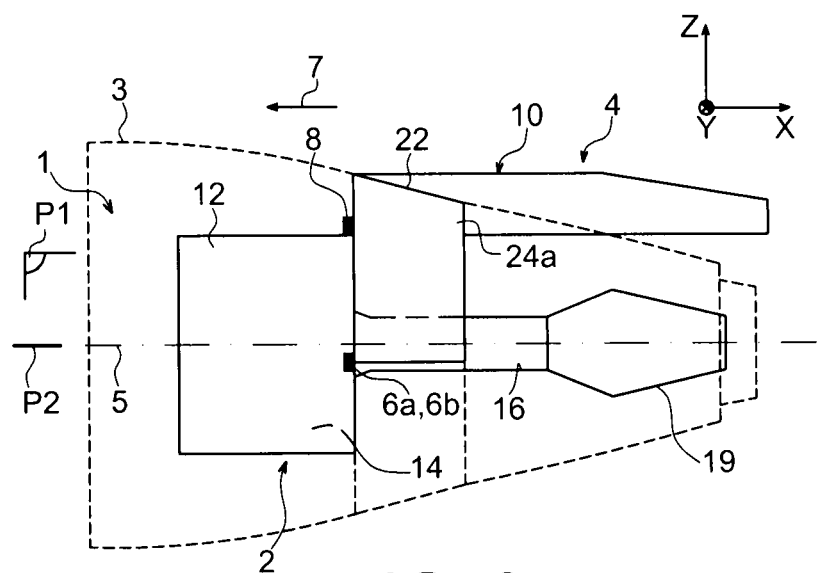
FIG. 3 shows a side view of an aircraft engine assembly according to a preferred embodiment of the present invention.

FIG. 3 shows an aircraft engine assembly 1 according to a preferred embodiment of the present invention, the assembly 1 being adapted to be fixed under an aircraft wing (not shown).

Generally, the engine assembly 1, also called an integrated propulsion system, is composed of a turbojet engine 2, a nacelle 3 (shown in dotted lines for the purpose of clarity), and a mounting pylon 4 provided with means for mounting the turbojet engine on the pylon, these means being preferably constituted of a plurality of engine mounts 6a, 6b, 8, fixedly connected to a rigid structure 10 of the mounting pylon (the mount 6b being hidden by the mount 6a in this FIG. 3). By way of example, it is noted that the assembly 1 comprises another series of mounts (not shown) providing the suspension of the assembly 1 under the aircraft wing.

Throughout the following description, by convention, X refers to the longitudinal direction of the pylon 4 that is also considered to be the same as the longitudinal direction of the turbojet engine 2, the direction X being parallel to a longitudinal axis 5 of the turbojet engine 2. Furthermore, the direction transverse to the pylon 4 is called the Y direction and can also be considered to be the same as the transverse direction of the turbojet engine 2, and Z is the vertical direction or the height, the three X, Y, and Z directions being orthogonal to each other.

Furthermore, the terms "forward" and "aft" should be considered with respect to a direction of motion of the aircraft that occurs as a result of the thrust applied by the turbojet engine 2, this direction being schematically shown by the arrow 7.

In FIG. 3 one can see that only the engine mounts 6a, 6b, 8 and the rigid structure 10 of the mounting pylon 4 are shown. The other constitutive elements (not shown) of the pylon 4, such as the mounting means of the rigid structure 10 under the aircraft wing, or even the secondary structure controlling segregation and retaining systems while supporting aerodynamic fairings, are conventional elements identical or similar to those encountered in the prior art and known by one having ordinary skill in the art. Consequently, no detailed description will be given of them.

Figure 1:
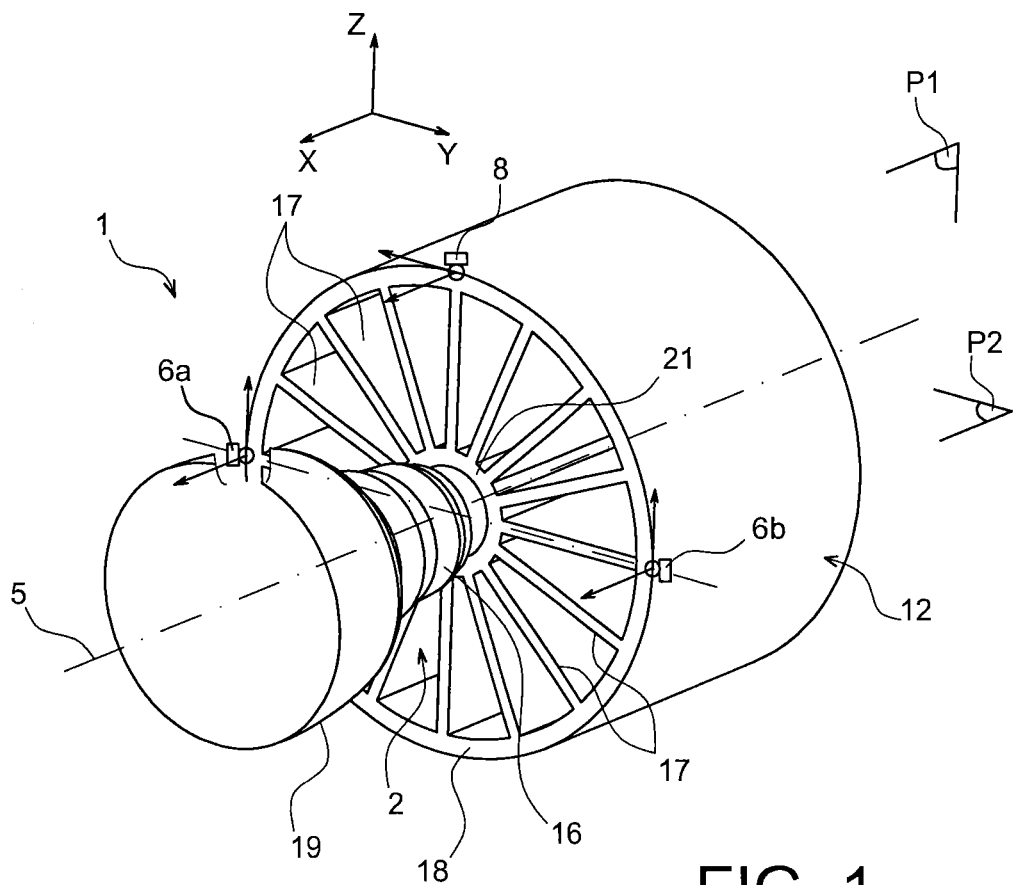
FIGS. 1 and 2, already described, show an aircraft engine assembly in accordance with prior art.
Figure 2:
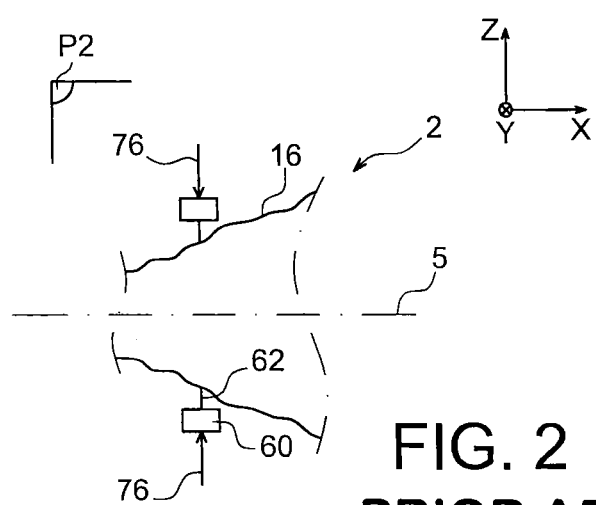

Furthermore, the turbojet engine 2 has a design which is identical or similar to that shown in FIG. 1, namely, comprising at the front a fan casing 12 of great dimension delimiting a annular fan duct 14, an intermediate casing 21 and structural arms 17 (not shown in FIG. 3), also called a outlet guide vanes, as well as a central casing 16 having a rear end 19.

It is evident from what precedes that it preferentially relates to a turbojet engine having a high bypass ratio.

As can be seen in FIG. 3, a first front engine mount 6a as well as a second front engine mount 6b are both adapted to be affixed onto the fan casing 12, symmetrically with respect to a plane P1, i.e., a first diametral plane defined by the axis 5 and the direction Z, the vertical plane P1 extending through a third front engine mount 8 also fixed to the fan casing 12, the three mounts all preferably extending through a plane which is orthogonal to the axis 5.

Figure 4:
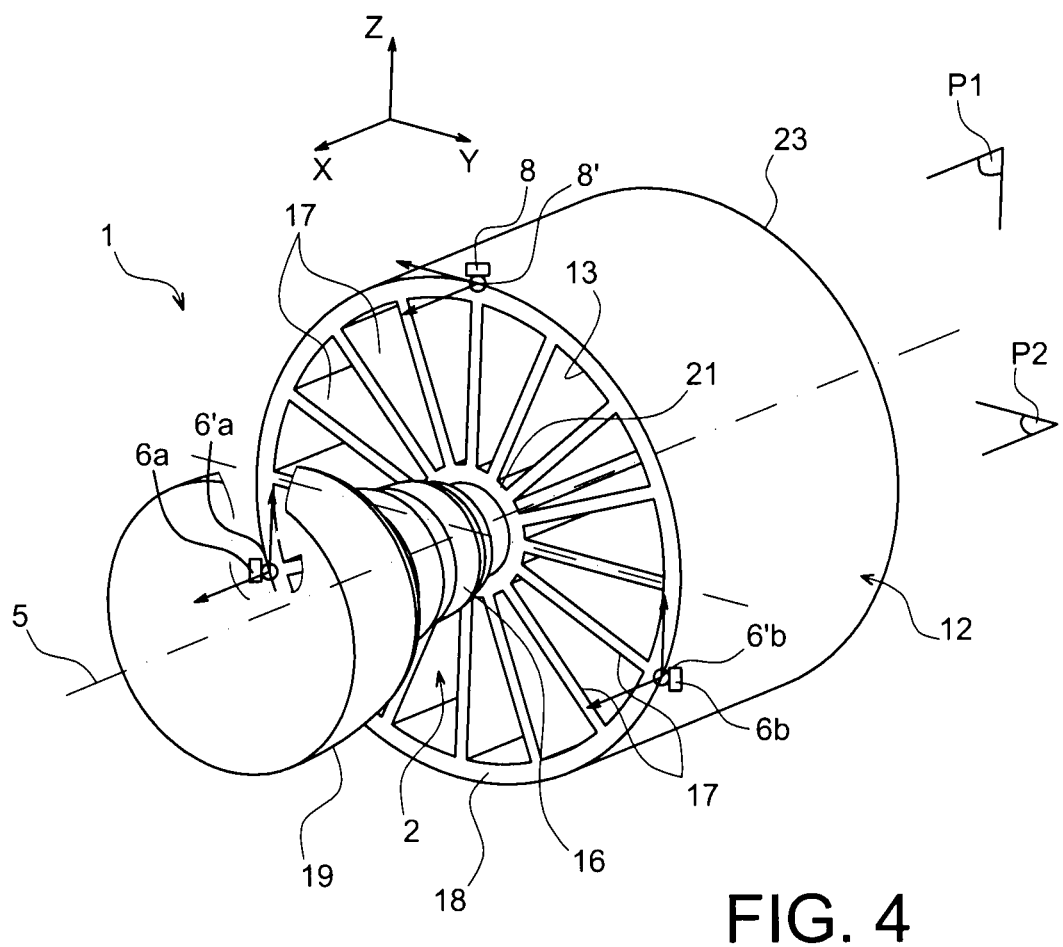
FIG. 4 shows a perspective view of the assembly shown in FIG. 3, the rigid structure of the pylon, the reinforcing structures and the nacelle having been removed to show more clearly the engine mounts.
Figure 5:
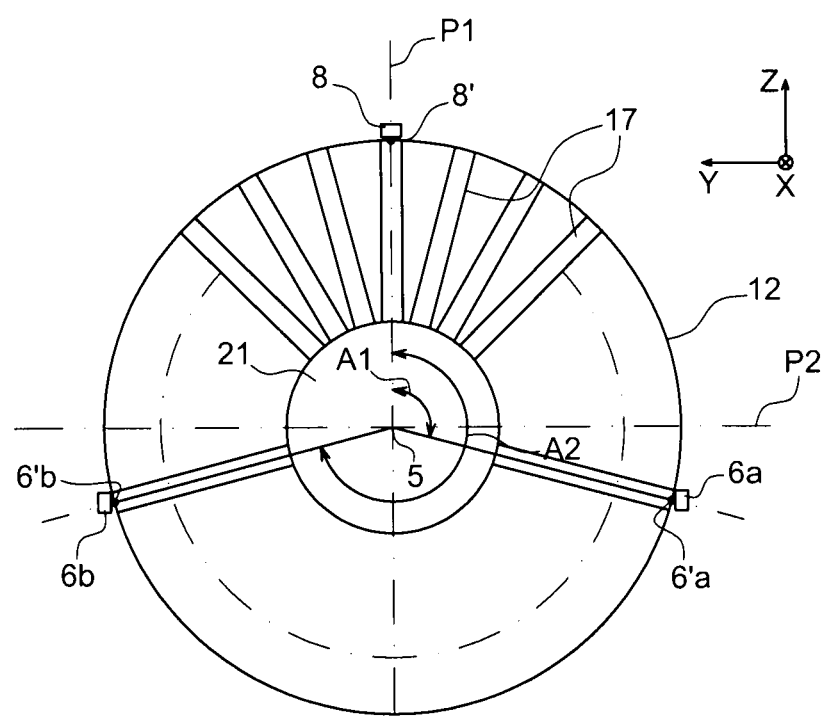
FIG. 5 shows a front schematic view corresponding to that of FIG. 4 showing the particular positioning of the engine mounts.

With reference to FIG. 4, one can see that the first mount 6a and the second mount 6b schematically shown are effectively arranged symmetrically with respect to the first diametral plane P1 of the turbojet engine, and preferably both arranged on a peripheral annular portion of the fan casing 12, and more precisely on the rear of this same portion. In this preferred embodiment, they are arranged under a plane P2, i.e., a second diametral plane of the turbojet engine, which is orthogonal with respect to the first, and therefore horizontal. The two connection points 6'a and 6'b of the mounts 6a, 6b on the casing 12 are therefore situated so that the second plane P2 is arranged between, on the one hand, these two points 6'a and 6'b, and on the other hand, a connection point 8' of the engine mount 8 on this same casing, in a front view according to the axis 5, such as that of FIG. 5.

In this drawing with a view along the axis 5, one can see that an angle A1 having as a center the longitudinal axis 5 between the anchoring points 8' and 6'a of the third and of the first engine mount, is strictly greater than 90° and preferably comprised between 90° and 110° not included. In a similar way, an angle A2 having as a center the longitudinal axis 5, between the anchoring points 8' and 6'b of the third and of the second engine mount, is strictly less than 270°, and preferably comprised between 250° and 270° not included.

This configuration of the mounts 6a, 6b allows for more greatly biasing the engine mount 8, and therefore for limiting the detrimental elongation effects of the fan casing encountered in the prior art embodiments, with the first and second engine mounts arranged in plane P2. Furthermore, it makes it possible to counter/compensate for an axis torque parallel to the direction Y, exerted on the turbojet engine, resulting in axial stresses passing through this same third mount 8. Although this configuration is preferred, the invention also applies to other arrangements of the engine mounts 6a, 6b, 8.

By way of example, it is noted that the engine mounts 6a, 6b, 8 are conventionally made, for example of the type integrating fittings and axles, the aforementioned anchoring/connecting points 6'a, 6'b, 8' corresponding to the contact points between the structure of these mounts and the structure of the fan casing.

As schematically shown by the arrows in FIG. 4, each of the first and second front engine mounts 6a, 6b is designed so as to be able to transfer forces generated by the turbojet engine 2 along the direction X and along the direction Z but not those exerted along the direction Y.

This way, the two mounts 6a, 6b spaced apart from one another jointly ensure the transfer of momentum exerted along the direction X and that of the momentum exerted along the direction Z. Still referring to FIG. 4, the third front mount is located at the highest portion of the fan casing 12, therefore on the highest portion of the peripheral annular portion, and is designed so as to be able to transfer forces generated by the turbojet engine 2 along the direction X and along the direction Y, but not forces exerted along the direction Z. In this manner, the third mount 8 jointly ensures with the mounts 6a, 6b the transfer of momentum being exerted along the direction Y.

The advantage of this non-limiting configuration resides in the fact that all the engine mounts are mounted on the fan casing, so that the bypass air is not affected at all by these mounts, thus causing a significant gain in terms of global performance of the engine. Furthermore, the three mounts form together an isostatic load transfer system.

Figure 6:
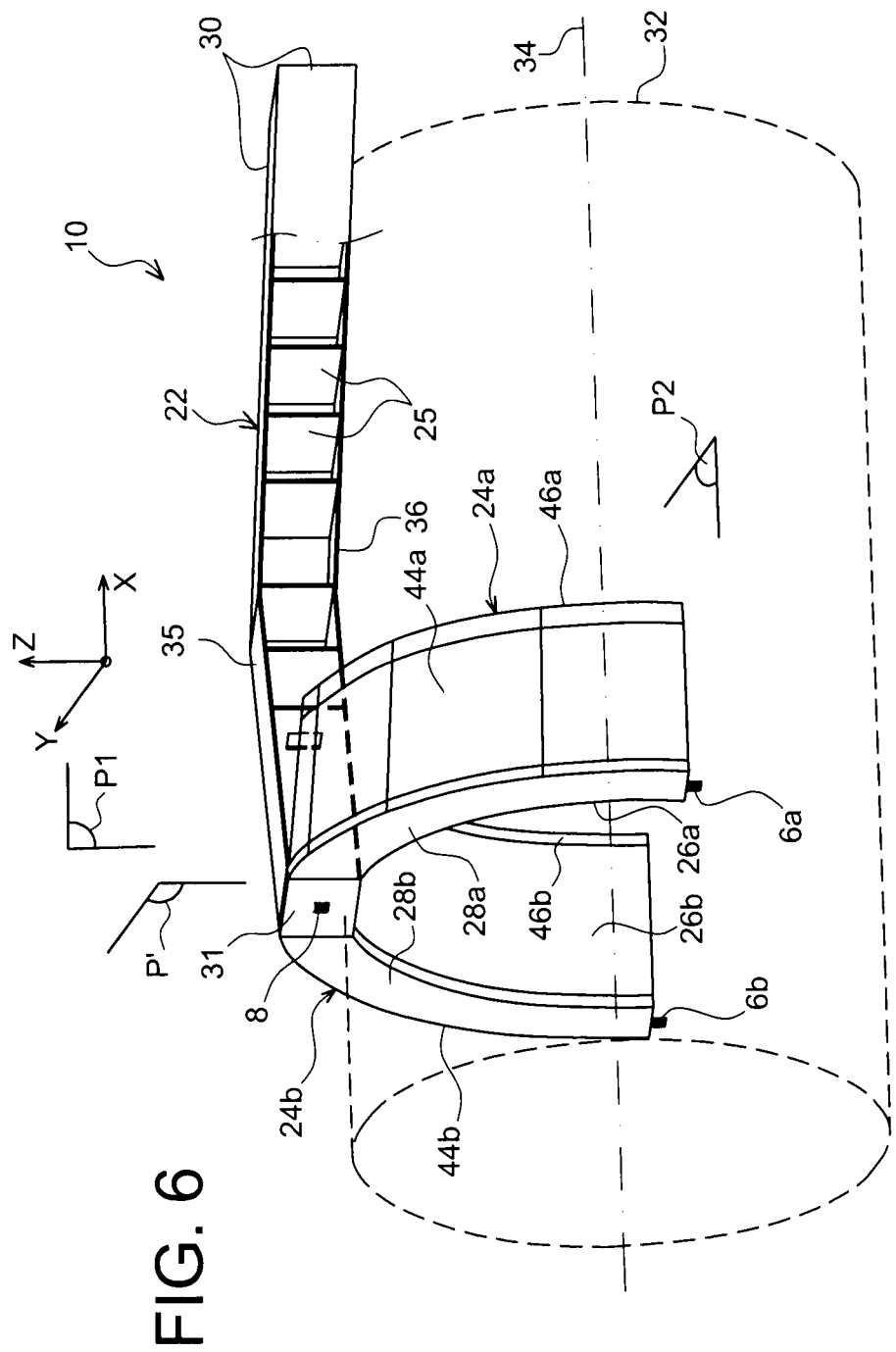
FIG. 6 shows a partial, enlarged, perspective view of the mounting pylon according to the preferred embodiment.

Now, with reference to FIG. 6, an exemplary embodiment of the rigid structure 10 of the attachment pylon 4 is shown. First, it is indicated that the rigid structure 10, also called a primary structure, is preferably designed so as to be symmetrical with respect to the diametral plane P1 indicated above, which means with respect to the vertical plane defined by the longitudinal axis 5 of the turbojet engine 2 and the direction Z. By way of example, this is generally the case when the engine is suspended or mounted above the wing, but not necessarily encountered when it is assembled at the aft section of the fuselage. Indeed, in this latter case which will be described in detail with reference to FIGS. 8 and 9, the rigid structure 10 can have another plane of symmetry as a function of its orientation with respect to the aft of the fuselage, for example a substantially horizontal or inclined plane of symmetry with respect to the horizontal, or even have no plane of symmetry. This especially occurs when the two lateral caissons which are described hereinafter, affixed to and arranged on both sides of a longitudinal caisson called central caisson, do not have the same circumferential length.

Therefore, the rigid structure 10 comprises a longitudinal caisson 22, called a longitudinal central caisson, and also called a torsion caisson, which extends from one end to the other of the structure 10 in the direction X, parallel to this same direction. By way of example, the caisson 22 can be formed by assembling two spars or lateral panels 30 extending along the direction X in parallel planes XZ and connected to each other by means of transverse ribs 25 which are oriented in parallel YZ planes. Furthermore, an upper spar 35 and a lower spar 36 are also provided to close the caisson 22.

Two lateral caissons 24a, 24b complete the rigid structure 10 whose central caisson 22 is located in the area of an upper portion of the same structure 10, each of the two caissons 24a, 24b being affixed to the central torsion caisson and projecting over both sides of the latter along the direction Y and downward. By way of example, it is noted that the caissons 22, 24a, 24b could be made so as to form only one, unique caisson, without leaving the scope of the invention.

Preferably, these lateral caissons connected affixedly to both sides at the front of the central caisson 22, have each an interior skin for closing the caisson 26a, 26b, also called a lower skin, oriented toward the turbojet engine and jointly delimiting a part of an imaginary substantially cylindrical surface 32 having a circular section and a longitudinal axis 34 parallel to the central caisson 22 and to the direction X, as shown in FIG. 6.

In other words, these two skins 26a, 26b are each provided with at least one part having a curvature adapted to be able to be positioned around and in contact with the imaginary surface 32. It is advantageously provided for the skins 26a, 26b to be part of the outer radial delimitation of an annular duct of air bypass (not shown), knowing that it is still possible to provide for an acoustic protection coating on these same closing skins, on their inner or outer surfaces indifferently. Alternatively, it is possible to provide for the lateral caissons to be entirely located above the fan casing, without leaving the scope of the invention.

By way of example, it is mentioned that the axis 34 preferably coincides with the longitudinal axis 5 of the turbojet engine 2.

Furthermore, the lateral caisson 24a, here identical and symmetrical to the lateral caisson 24b, comprises an outer skin for closing the caisson 44a, whereas the lateral caisson 24a also comprises an outer skin for closing the caisson 44b.

The closing outer skins 44a, 44b, also called upper skins, preferably each constitute a portion of the outer aerodynamic surface of the nacelle, advantageously implying that at least one portion of the pylon is an integral part of the nacelle.

Figure 7:
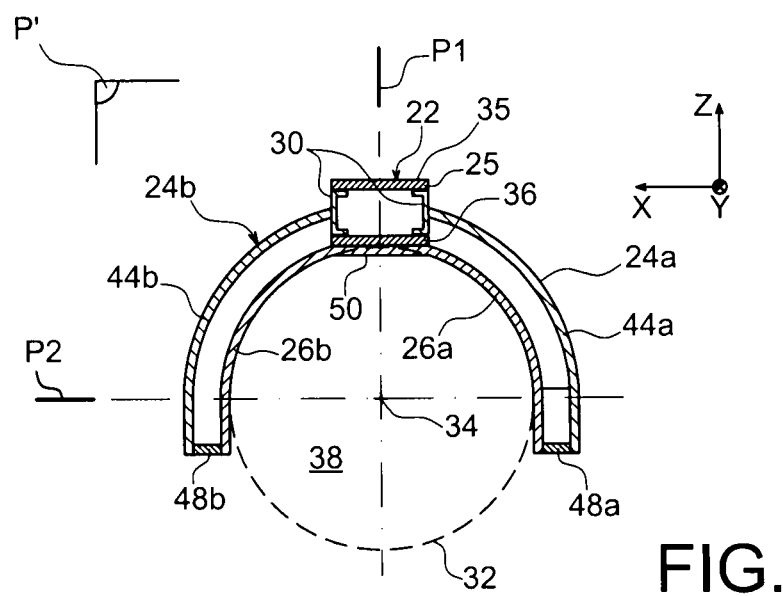
FIG. 7 shows a cross-sectional view according to the transverse plane P' of FIG. 6.

FIG. 7 shows a cross-sectional view along a transverse plane P' extending through the lateral caissons 24a, 24b, in any manner.

In this drawing, one can effectively see that the two inner skins for closing the caisson 26a, 26b define with a portion of their outer surface a portion of the substantially cylindrical imaginary surface 32 having a circular section. It is noted that to create the least perturbation possible of the air bypass escaping from the annular fan duct 14, the diameter of the cylindrical imaginary surface 32 is preferably substantially identical to the diameter of the cylindrical outer surface of the annular portion of the fan casing 12. This specificity naturally goes in the same trend of thoughts aiming at providing for the skins 26a, 26d to participate to the outer radial delimitation of this annular duct of bypass air.

On the other hand, as can be seen in FIG. 7, the elements of the central caisson 22 project only over a very small distance inside the space 38 delimited by the imaginary surface 32, so that they do not significantly affect the flow of bypass air. This is notably explained by the fact that the height along the direction Z of the lateral spars 30 is extremely small with respect to the diameter of the imaginary 32 and outer 18 surfaces.

With reference to FIGS. 6 and 7, the skins 26a, 44a are connected to one another by means of a front closing frame 28a and a rear closing frame 46a, the frames 28a, 46a being transversely oriented and located respectively at the front and at the rear of the caisson 24a. Furthermore, a closing plate 48a located below the plane P2 closes a lower portion of the caisson 24a, and therefore connects the lower end of the frames 28a, 46a, and of the skins 26a, 44a.

Naturally, the lateral caisson 24b comprises elements 26b, 44b, 28b, 46b, and 48b, respectively identical to the elements 26a, 44a, 28a, 46a, and 48a of the caisson 24a, these two caissons being, for example, susceptible of carrying, preferably in an articulated manner, cowls of the nacelle.

The two skins 26a, 26b are preferably made in one piece and connected to one another in the area of their upper portions by means of a junction plate 50 oriented along a plane XY and positioned in contact with the lower spar 36 of the central caisson 22. Similarly, the two front closing frames 28a, 28b can also be provided to be made in one piece and connected to one another in the area of their upper portions by means of a front closing frame 31 of the caisson 22, the frame 31 being oriented along a plane YZ. Consequently, in this configuration, the frames 28a, 28b, 31 made in one piece are therefore arranged in the same plane YZ and constitute a front end of the rigid structure 10 of the pylon 4.

Therefore, the rigid structure 10 of the attachment pylon 4 is absolutely adapted to support the front engine mounts 6a, 6b, 8 since the latter can easily be fixed onto the transverse element made in one piece integrating the frames 28a, 28b, and 31, as shown in FIG. 1, and having, for example, the general shape of a U, as does the entire rigid structure viewed from the front.

An alternative solution can be envisioned, in which the lateral caissons would form a semi-cylindrical barrel and no longer U-shaped, additional structural elements thus being provided under these caissons in order to offset the first and second engine mounts under the second diametral plane P2. This configuration is particularly interesting when assembling the turbojet engine onto the pylon with a vertical motion, from underneath.

By way of example, all of the elements constituting the rigid structure 10 which has just been described are made of metallic materials such as steel, aluminum, titanium, or even by means of composite materials, preferably made of carbon.

It is to be remembered that if the lateral caissons 24a, 24b can effectively have a different circumferential length, mostly in the case when the assembly is attached to the aft section of the fuselage, it is also indicated that in this latter case, these caissons could be fixed to the central caisson 22 in another position than on the front portion of the latter, without leaving the scope of the invention.

Figure 8:
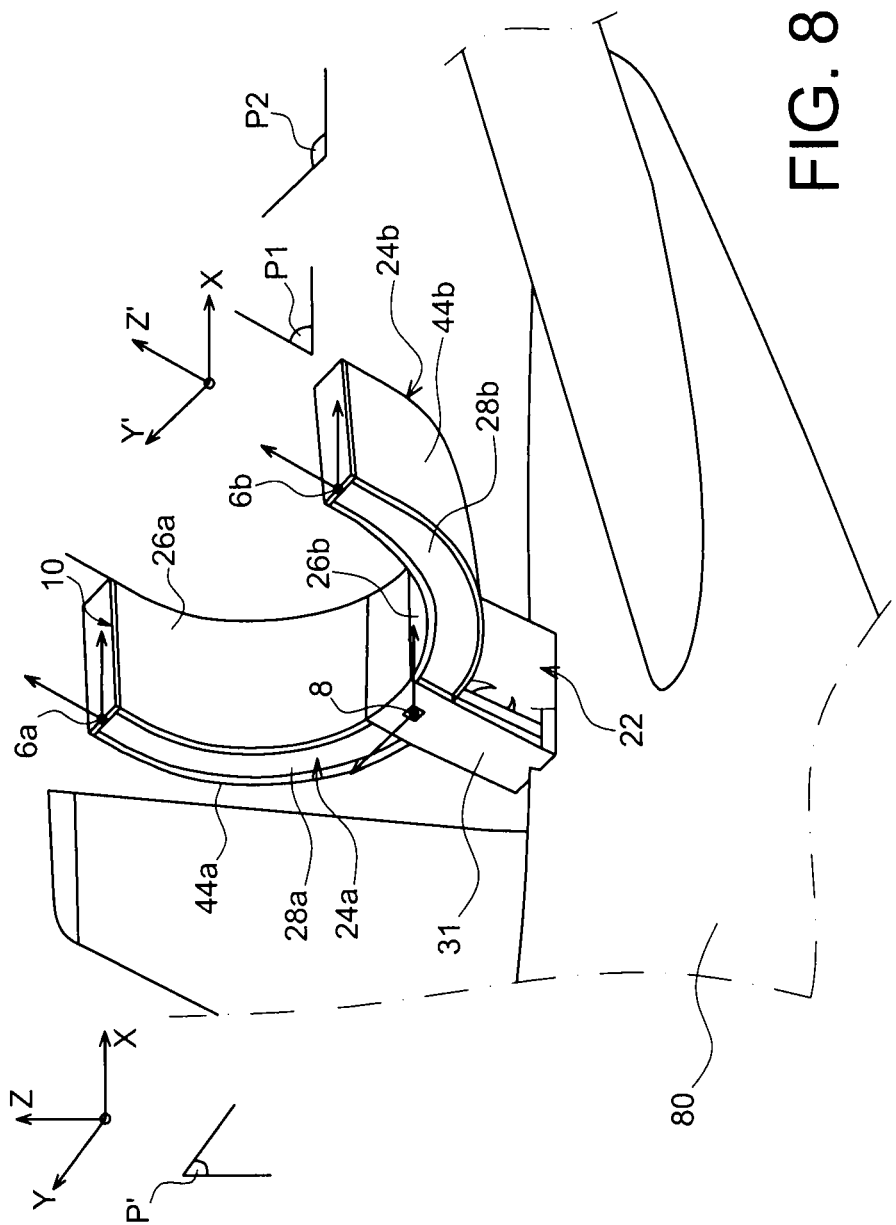
FIG. 8 shows a perspective view of a mounting pylon of an aircraft engine assembly according to another preferred embodiment of the invention.
Figure 9:
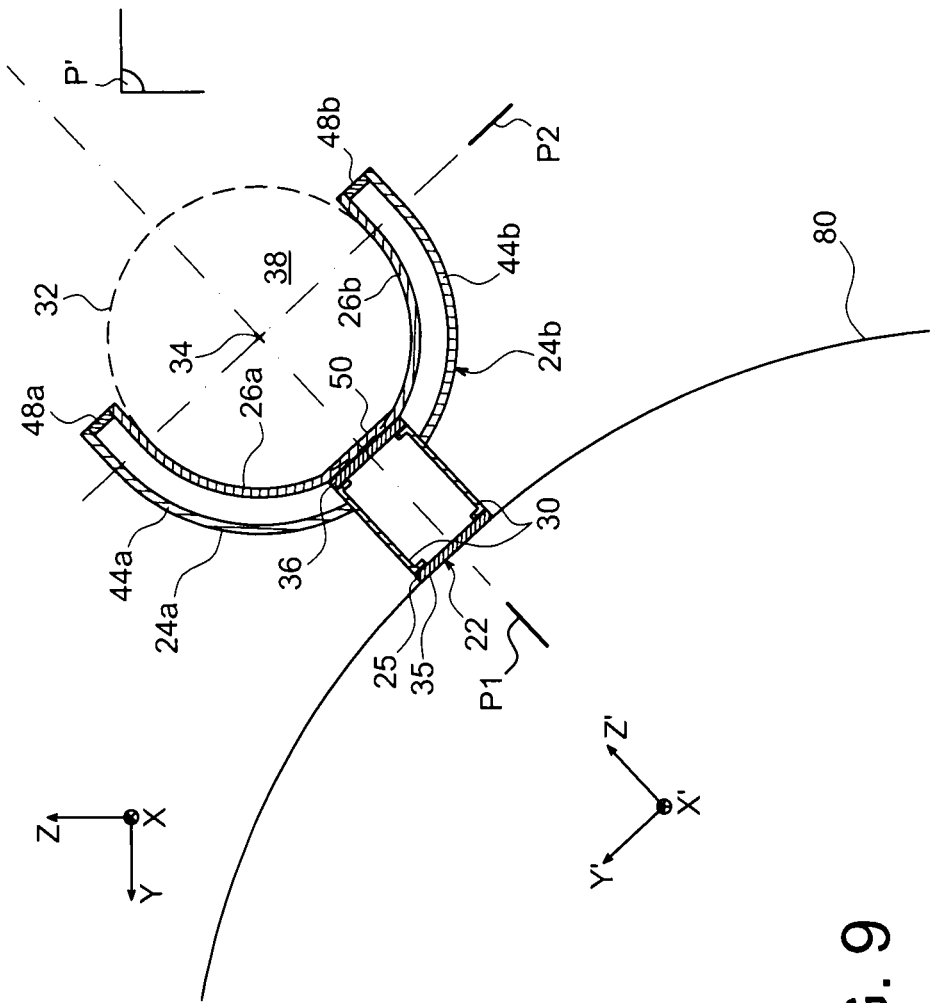
FIG. 9 shows a cross-sectional view according to the transverse plane P' of FIG. 8, crossing through the rigid structure of the mounting pylon.

In this respect, now with reference to FIGS. 8 and 9, the rigid structure 10 of an attachment pylon of an engine assembly according to another preferred embodiment of the invention whose particularity is to be adapted to be applied to the aft section of a fuselage 80 of the aircraft.

The rigid structure 10 is designed substantially identically to that described in the aforementioned embodiment, as can be seen from the numerical references corresponding to identical or similar elements to those previously described.

One can see that the main difference, resulting from the fastening onto the aft section of the fuselage 80, resides in the angle of the rigid structure 10, insofar as the two lateral caissons 24a, 24b now form together a portion of a substantially cylindrical envelope/cage, which is no longer situated around an upper demi-diameter, but arranged around a substantially lateral demi-diameter of this same turbojet engine (not shown).

More precisely, the rigid structure 10 is preferably designed so as to have a symmetry with respect to the diametral plane P1 which is no longer vertical, but defined by the longitudinal axis 5 of the turbojet engine 2 and a first direction Z', orthogonal with respect to the direction X, the first direction Z' being inclined with respect to the aforementioned directions Z and Y, corresponding respectively to the vertical and transverse directions of the turbojet engine. Preferably, the plane P1 can be such that it rises while moving away from the fuselage 80, at an angle, for example comprised between 10° and 60° with respect to the horizontal position, which means with respect to any plane XY.

The first front engine mount 6a as well as the second engine mount 6b are both adapted to be fixed to the fan casing, symmetrically with respect to the plane P1 defined hereinbefore, as shown in FIG. 8. The first and second front engine mounts 6a and 6b are thus provided to be arranged beyond the diametral plane P2, orthogonal to P1, facing mount 8. Here again, this can be summed up by the fact that the diametral plane P2 is located between on the one hand, the two mounts 6a, 6b, and on the other hand, the engine mount 8.

Here, the plane P2 is defined by the longitudinal axis 5 and a second direction Y', orthogonal to the direction X and to the first direction Z', so that it is also inclined with respect to the directions Z and Y.

As schematically shown by the arrows in FIG. 8, each one of the first and second front engine mounts 6a, 6b is designed so as to be able to take up forces generated by the turbojet engine 2 along the direction X and along the first direction Z', but not the forces exerted along the direction Y'.

This way, the two mounts 6a, 6b, greatly spaced apart from one another, jointly ensure the transfer of momentum exerted along the direction X, and that of the momentum exerted along the direction Z'.

Still with reference to FIG. 8, one can see that a third front engine mount 8, schematically shown, is also adapted to be fixed onto the peripheral annular portion of the fan casing (not shown), also preferably at the rear of this portion. The third front mount 8, extending through the imaginary plane P1 hereinbefore mentioned, is designed to as to be able to take up only forces generated by the turbojet engine 2 along the direction X and along the direction Y', and therefore not the forces exerted along the direction Z'.

This way, the third mount 8 ensures, jointly with the two other mounts 6a, 6b, the transfer of momentum exerted along the second direction Y'.

Finally, even if it is not shown, it is noted that it is preferably provided to have one or several nacelle cowls mounted on the rigid structure 10, and in particular the lateral caissons 24a, 24b.

Figure 10:
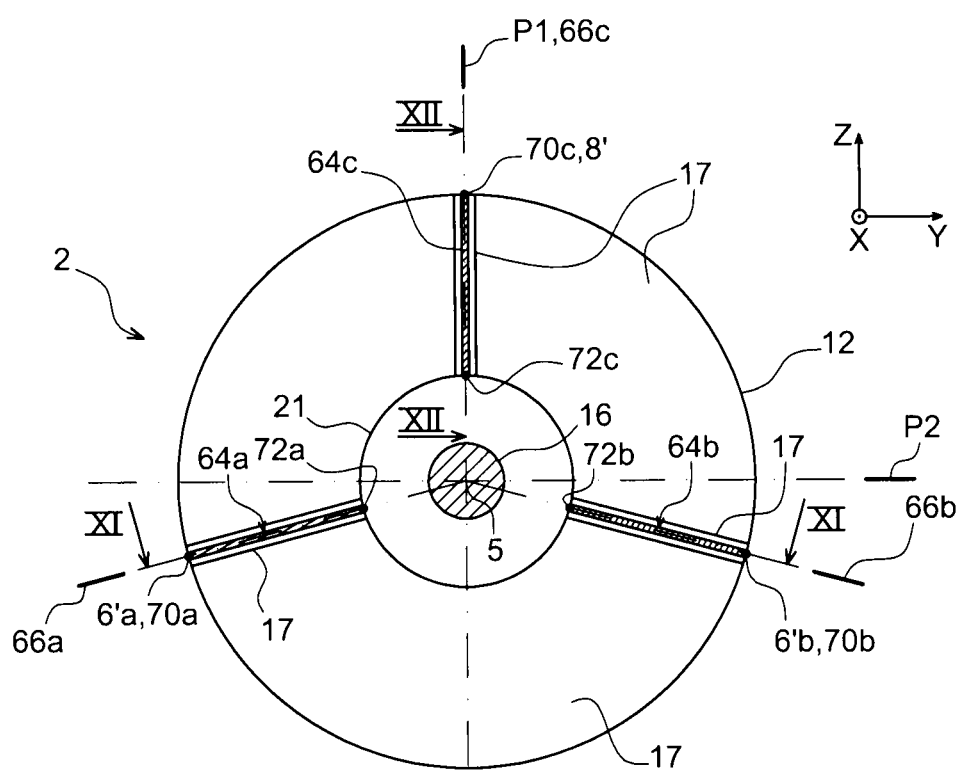
FIG. 10 shows a transverse cross-sectional view showing the reinforcing structures connecting the fan casing to the central casing, this drawing corresponding also to a cross-sectional view along the line X-X of FIG. 11.
Figure 11:
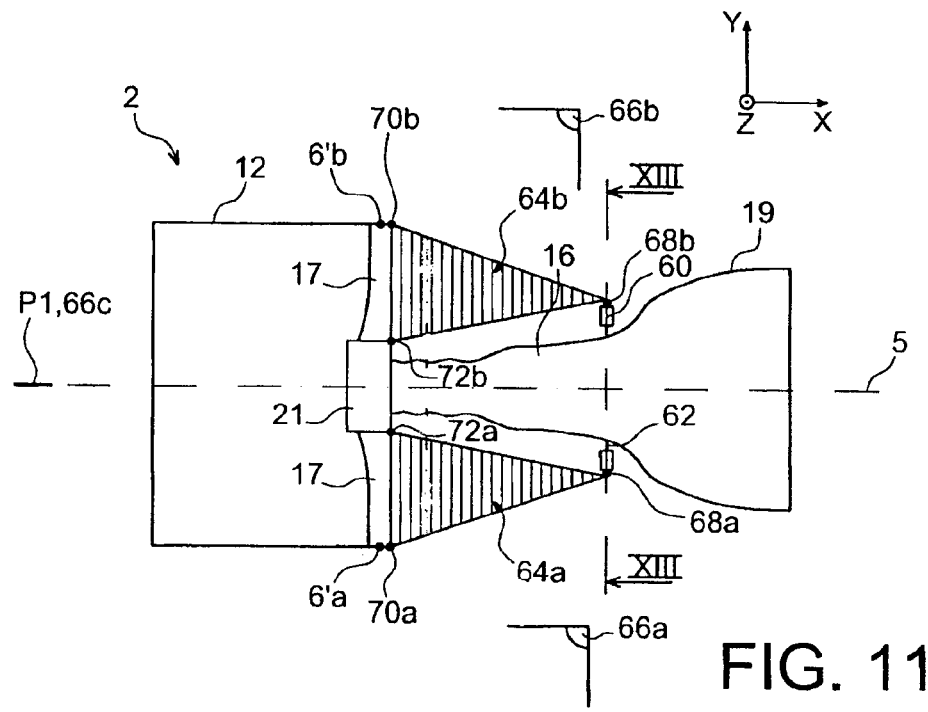
FIG. 11 shows a cross-sectional view along the line XI-XI of FIG. 10.
Figure 12:
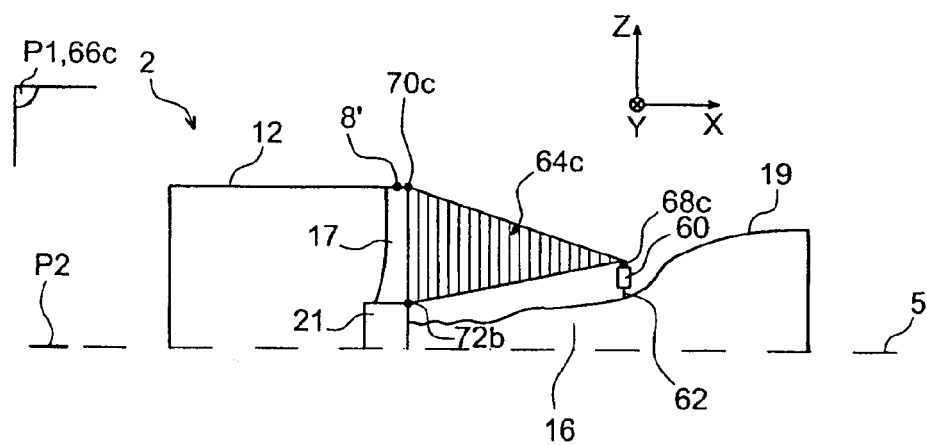
FIG. 12 shows a cross-sectional view along the line XII-XII of FIG. 10.

In FIGS. 10 to 12, the turbojet engine further integrates reinforcing structures connecting the fan casing to the central casing. In the drawings, the turbojet engine 2 is shown in a position such as adopted when it is suspended under the wing. However, the embodiment described can be considered for any positioning of the turbojet engine, particularly when it is applied to the aft portion of the fuselage, such as shown in FIGS. 8 and 9.

First, an annular load-transfer structure 60, also called rim or ring, surrounding the central casing 16 and centered on the axis 5, is provided. The ring 60, radially spaced from the central casing 16, is mechanically connected to the latter by the intermediary of mounting means 62, of the rod type, such as shown hereinafter. Preferably, the ring 60 is located toward the rear of the central casing 16, for example downstream of the combustion caisson, and more preferably in the area of an inter-turbine casing facing a stationary element of the structure, ideally at the end of the casing of a high-pressure turbine. For better support, it is preferably located perpendicular to a shaft bearing of the turbojet engine.

First, a reinforcing structure forming a shear plane, associated with each of the first and second engine mounts 6a, 6b, is provided.

Thus, relating to the first engine mount 6a, a reinforcing structure 64a forming a shear plane is arranged in a radial imaginary plane 66a passing through the axis 5, and passing also through the anchoring point 6'a of the mount 6a.

As shown in FIG. 11, the structure 64a preferably takes a substantially triangular planar shape, possibly perforated for mass reduction. The triangle is fixedly connected in the area of the ring 60 at a first anchoring point 68a in the area of the fan casing 12, in the vicinity of a point 6'a located in the same imaginary plane 66a, at a second anchoring point 70a, and in the area of the junction between a structural arm 17 and the intermediate casing 21, at a third anchoring point 72a. Therefore, the triangular structure 64a forming a shear plane has a parallel base running alongside the structural arm arranged in the imaginary plane 66a, the latter being inclined with respect to the directions Y and Z because of the offset of the mount 6a below the diametral plane P2.

The imaginary plane 66a in which the triangular reinforcing structure 64a is part of, is radial here, which means it passes through the longitudinal axis 5. However, it could be arranged differently, namely, parallel to the longitudinal axis 5, without integrating it. This is notably the case when the structural arms are not radial themselves, but rather inclined in a transverse plane so that their axis does not intersect with the longitudinal axis 5. In such a configuration, the triangular structure 64a preferably continues to have a parallel base which runs along the structural arm 17 placed in the imaginary plane 66a. In other words, the triangular structure 64a is preferably provided to be located in the rear extension of one of the structural arms 17, this arm and the structure 64a being thus located in the same imaginary plane 66a. It must be noted that this specificity is also applicable for each of the other reinforcing structures described hereinafter.

In the same manner, an identical or similar design is adopted for the second mount 6b. Consequently, in the drawings, the numerical references pertaining to the elements related to the reinforcing structure 64b forming a shear plane in a radial imaginary plane 66b therefore were attributed the letter "b" instead of the letter "a" used for identical elements in relation with the reinforcing structure 64a.

Similarly, the structure 64b preferably takes a substantially triangular planar shape, possibly perforated for mass reduction. The triangle is fixedly connected in the area of the ring 60 at an anchoring point 70b, and in the area of the junction between a structural arm 17 and the intermediate casing 21, at a third anchoring point 72b.

Therefore, the structures 64a, 64b end up symmetrical with respect to the diametral plane P1, corresponding also to another imaginary plane 64c, in which a third reinforcing structure 66c forming a shear plane attached to a third engine mount 8, is located. In this respect, it must be noted that, in the conceivable case where the engine mounts 6a, 6b are arranged in the plane P2 and not below it, the two radial imaginary planes 64a, 64b would therefore be merged with the plane P2.

Similarly, the structure 64c preferably takes a substantially triangular planar shape, possibly perforated for mass reduction. The triangle is fixedly connected in the area of the ring 60 at an anchoring point 70c, and in the area of the junction between a structural arm 17 and the intermediate casing 21, at a third anchoring point 72c.

Here also, in the drawings, the numerical references pertaining to the elements related to the reinforcing structure 64c forming a shear plane arranged in a radial imaginary plane 66c, were attributed the letter "c" instead of the letter "a" used for identical elements in relation with the reinforcing structure 64a.

The three structures 64a, 64b, 64c, preferably substantially identical, allow for wholly rigidifying the central casing 16, thus limiting its flexion, even in the case of inertial forces exerted in the imaginary planes 66a, 66b, 66c, the latter corresponding here to the vertical plane. Furthermore, they limit the deformation of the structural arms in these imaginary planes, and in the vicinity, and advantageously limit the elongation effects of the fan casing 12.

Preferably, the structures 64a, 64b, 64c can each play a role in the air bifurcation of the bypass air of the turbojet engine, the main function of these bifurcations being to integrate the passage of systems and/or to provide an acoustic treatment while constituting aerodynamic surfaces.

Finally, to keep an isostatic load-transfer, the reinforcing structures are deprived of direct mechanical connection with said pylon and also with the nacelle.

Figure 13:
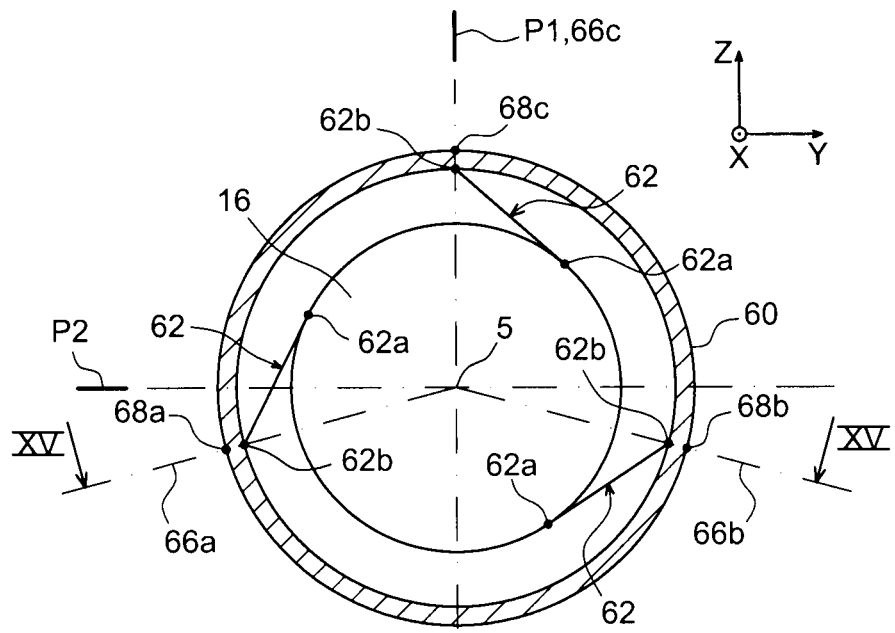
FIG. 13 shows a transverse, cross-sectional view schematically showing the mounting means extending between the annular structure of stress transmission and the central casing of the turbojet engine.
Figure 14:
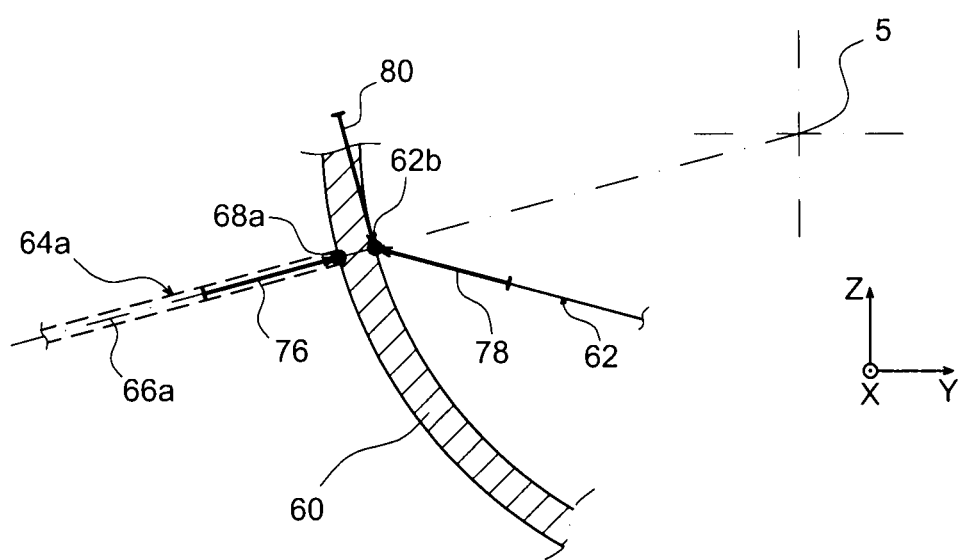
FIG. 14 shows a partial, enlarged view of that shown in FIG. 13, schematically showing the stress distribution on the annular structure, in the area of a load application point.

FIGS. 13 and 14 show one of the particularities of the present invention, which resides in the design of the mounting means 62 applied between the annular load-transfer structure 60 and the central casing 16.

First, it must be noted that the aforementioned anchoring points 68a, 68b, 68c each form a load application point in the ring 60, these points being distributed circumferentially along the latter. Furthermore, due to the preferred radial orientation of the aforementioned reinforcing structures associated with these points 68a, 68b, 68c, the force biasing the ring 60 is also radially oriented, namely, extending by a direction through the axis 5, on which the same ring is centered. However, it is to be remembered that reinforcing structures could be oriented differently than radially without leaving the scope of the invention.

Each of these three anchoring points 68a, 68b, 68c is associated with at least one connecting rod 62, each rod, viewed from the front along the axis 5 as shown in FIG. 13, being arranged tangentially with respect to the central casing 16. More precisely, the rods 62 are preferably all arranged substantially in a same transverse plane of the turbojet engine.

It is preferably provided for a unique rod 62 to extend from each of the upper 68c and lower 68a, 68b points.

For each one of the rods 62, an inner end 62a connected as a ball-fitting on the central casing 16 as well as an outer end 62b connected as a ball-fitting to the ring 60 are provided. More particularly, the outer end 62b is arranged so as to be passed through, in front view, by the radial imaginary plane 66a, 66b, 66c passing by the longitudinal axis 5 and the related load application point 68a, 68b, 68c. By way of example, it results, generally, that for a given engine mount, the anchoring point of the mount on the fan casing, the anchoring point of the reinforcing structure associated on the fan casing, the reinforcing structure itself, the load application point in the ring forming an anchoring point of the reinforcing structure on this ring, as well as the outer end of the associated rod, are all arranged in a same imaginary radial plane, in which one of the structural arms connecting the casings 12 and 16 is also preferably located.

The ball-fitting aspect of the fastening of the rods 62 ends makes it possible to better deal with the thermal expansion of the central casing with respect to the annular structure 60 which surrounds it, both in the radial direction and in the longitudinal direction. Indeed, the ball-fitted rods positioned as described hereinabove, are easily capable of accompanying the deformations of the central casing in these two directions, when the latter expands, without causing negative constraints.

Furthermore, as shown in FIG. 13, each of the three rods extends in the same circumferential direction from its outer end 62b, for example clockwise, as shown. With this configuration, in case of differential thermal expansion between the ring 60 and the casing 16 or the rods 62, the ring 60 can turn about the central casing 16 while staying coaxial to the latter.

With reference, more specifically, to FIG. 14, the distribution of the forces in the area of the load application point 68a is detailed, the principle remaining analogous for the two other points 68b, 68c.

In the area of the load application point 68a, the force 76 from the associated reinforcing structure 64a is arranged substantially radially, and more particularly in the corresponding imaginary radial plane 66a. The radial force 76 is taken up on the one hand by a compression or traction force in the rod 62, and on the other hand by a force 80, necessarily substantially tangential, in the ring 60, this force being also called membrane force. Consequently, in the area of each of the three load application points of the ring, the latter tends to respond to the mechanical biasing of the reinforcing structures by a substantially tangential force, greatly limiting the risks of elongation.

Figure 13A:
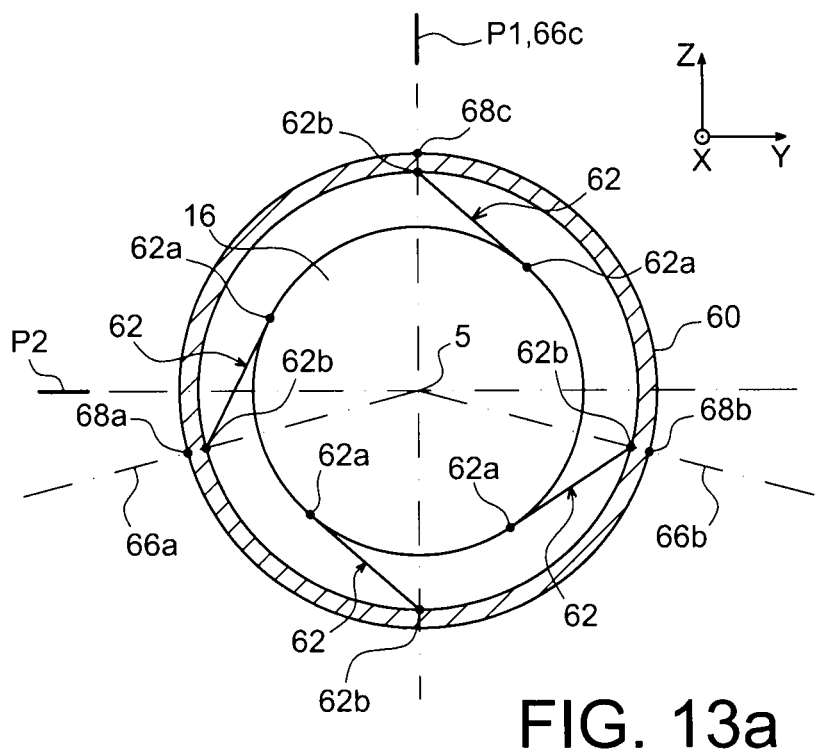
FIG. 13a shows a similar view as that of FIG. 13, the mounting means being in the form of an alternative embodiment.

In FIG. 13a showing an alternative embodiment, a judiciously positioned fourth rod 62 is provided in addition to the three rods 62 hereinabove described in reference to FIG. 13.

Indeed, in order to homogenize the distribution of forces, a fourth rod 62 is associated to the three rods 62 extending from the respective load application points 68a, 68b, 68c connecting the ring 60 to the casing 16, this fourth rod being arranged symmetrically with respect to that attached to the third engine mount, by central symmetry having a center consisting of the axis 5. Therefore, its outer end 62b is also arranged so as to extend through, in front view, the imaginary radial plane 66c extending through the longitudinal axis 5 and the related load application point 68c.

Furthermore, as shown in FIG. 13a, each of the four rods extends in the same circumferential direction from its outer end 62b, for example clockwise, as shown. Here again, in case of differential thermal expansion between the ring 60 and the casing 16 or the rods 62, the ring 60 can turn about the central casing 16 while staying coaxial to the latter. Actually, in the case where the first and second engine mounts are arranged in the plane P2, the four rods 62, tangential to the casing 16 are thus distributed along a central symmetry having a center constituted by the longitudinal axis 5.

Figure 15:
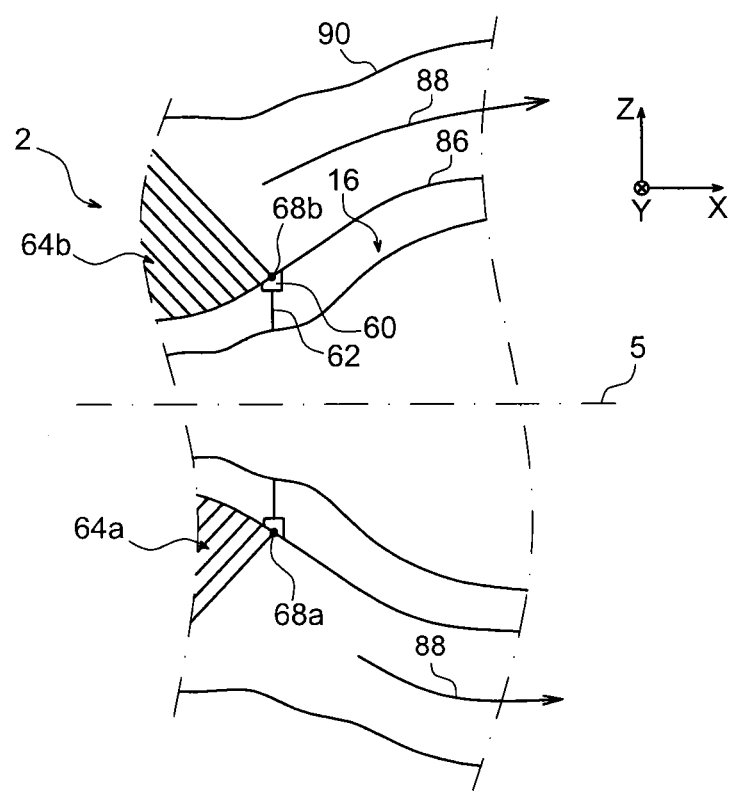
FIG. 15 shows another preferred embodiment corresponding to a cross-sectional view along the line XV-XV of FIG. 13.

In FIG. 15 showing another embodiment, the rods 62, arranged in the manner described hereinabove, are still connected to the ring 60, which is itself connected not only to the load application points 68a, 68b, 68c, but also carried by a structure 86 of inner radial delimitation if the air bypass annular duct 88 "IFS" (Inlet Fan Structure). By way of example, the structure 86 is radially arranged toward the inside with respect to a structure 90 of outer radial delimitation of the air bypass annular duct "OFS" (Outlet Fan Structure), itself located in the rear extension of the inner skins of the lateral caissons of the attachment pylon.

In such a case, as mentioned hereinabove, one can effectively provide for the reinforcing structures 64a, 64b, 64c running along the inner structure 80, to play an additional role in the bifurcation of the air in the air bypass of the turbojet engine.

In FIGS. 13 to 15, the turbojet engine 2 is shown in a position such as the one adopted when it is suspended under the wing. However, here again, the particular configuration of the mounting means 62, described hereinabove, can be considered for any positioning of the turbojet engine, particularly when it is applied to the aft section of the fuselage, such as shown in FIGS. 8 and 9.

Naturally, various modifications can be made by one having ordinary skill in the art to the aircraft engine assembly 1 which has just been described, only by way of non-limiting example. To this respect, it must be noted that the two optional specificities shown in FIGS. 3 to 9 and 10 to 12 respectively have been described in combination, but they could be provided one without the other without leaving the scope of the invention.

The invention claimed is:

1. An aircraft engine assembly comprising:
a turbojet engine comprising a fan casing, an intermediate casing located radially toward the inside with respect to the fan casing and connected to the fan casing by a plurality of structural arms, and a central casing extending along the intermediate casing toward the rear;
an annular load-transfer structure surrounding the central casing and mechanically connected to the central casing by an intermediary of a mounting means, the mounting means comprising a plurality of connecting rods, the annular structure being also connected to a plurality of substantially planar structures arranged externally with respect to the annular load-transfer structure, and biasing the central casing respectively at a plurality of load application points circumferentially distributed on the annular load-transfer structure;
wherein at least one connecting rod of the plurality of connecting rods is associated with a load application point from the plurality of load application points,
wherein the at least one connecting rod, when viewed from the front along a longitudinal axis of the turbojet engine, is positioned tangentially with respect to the central casing, and includes an inner end connected to the central casing, and an outer end connected to the annular load-transfer structure so that a plane in which the annular load-transfer structure is located extends through the load application point from the plurality of load application points, and extends through the at least one connecting rod,
wherein the connecting rods all extend in a same circumferential direction from an outer end of the connecting rods, and
wherein under differential thermal expansion the annular load-transfer structure turns about the central casing while staying coaxial with the central casing.

2. An aircraft assembly according to claim 1, wherein the substantially planar structures are arranged substantially radially and bias substantially radially the annular structure.

3. An aircraft assembly according to claim 1, wherein the connecting rods are arranged substantially in a same transverse plane of the turbojet engine.

4. An aircraft assembly according to claim 1, wherein the connecting rods have inner and outer ends mounted as ball joints.

5. An aircraft assembly according to claim 1, further comprising:
an attachment pylon including a rigid structure and means for mounting the turbojet engine on the rigid structure, the mounting means comprising first, second, and third front engine mounts for transferring thrust forces to the fan casing, and arranged so that the third front engine mount extends through a first diametral plane of the turbojet engine, the first and second front engine mounts being arranged on both sides of the first diametral plane, and each of the first, second, and third front engine mounts being associated with a substantially planar reinforcing structure forming a shear plane, wherein the substantially planar reinforcing structure is fixedly connected in an area of the annular structure at a first anchoring point forming the load application point in the annular load-transfer structure;

in an area of the fan casing at a second anchoring point; and in an area of a structural arm of the plurality of structural arms of the intermediate casing at a third anchoring point, and at a fourth anchoring point of the front engine mount on the fan casing, wherein the substantially planar reinforcing structure extends along the plane extending through the load application point.

6. An aircraft assembly according to claim 5, wherein the substantially planar reinforcing structure limits flexion of the central casing and limits elongation effects of the fan casing.

7. An aircraft comprising at least one engine assembly according to claim 1, assembled on a wing or an aft section of a fuselage of the aircraft.

* * * * *